United States Patent
Heyl

(10) Patent No.: US 6,539,737 B2
(45) Date of Patent: Apr. 1, 2003

(54) COMBINED COOLING PLANT AND HEAT PUMP, ESPECIALLY FOR THE HEATING AND COOLING OF THE PASSENGER CELLS OF MOTOR VEHICLE

(75) Inventor: Peter Heyl, Köhn (DE)

(73) Assignee: Visteon Global Technologies, Inc., Dearborn, MI (US)

(*) Notice: Subject to any disclaimer, the term of this patent is extended or adjusted under 35 U.S.C. 154(b) by 0 days.

(21) Appl. No.: 10/122,818

(22) Filed: Apr. 13, 2002

(65) Prior Publication Data

US 2002/0148244 A1 Oct. 17, 2002

(30) Foreign Application Priority Data

Apr. 14, 2001 (EP) .............................. 01109262

(51) Int. Cl.[7] .................................. F25B 41/04
(52) U.S. Cl. ...................... 62/225; 236/92 B
(58) Field of Search ............... 62/199, 225, 324.6; 236/92 B; 137/605

(56) References Cited

U.S. PATENT DOCUMENTS

| | | | | |
|---|---|---|---|---|
| 2,463,951 A | * | 3/1949 | Carter ...................... 236/92 B |
| 2,472,149 A | * | 6/1949 | Dillman ..................... 236/92 B |
| 2,475,556 A | * | 7/1949 | Seligman et al. ......... 236/92 B |
| 6,079,220 A | * | 6/2000 | Buck ............................ 62/202 |
| 6,167,712 B1 | * | 1/2001 | Lim et al. ..................... 62/113 |
| 6,253,561 B1 | * | 7/2001 | Imakubo ...................... 62/158 |
| 6,276,153 B1 | * | 8/2001 | Skupin et al. ................ 62/160 |
| 6,370,895 B1 | * | 4/2002 | Sakuma et al. ............... 62/152 |

* cited by examiner

*Primary Examiner*—William E. Tapolcai
*Assistant Examiner*—Mohammad M. Ali
(74) *Attorney, Agent, or Firm*—Brinks Hofer Gilson & Lione

(57) ABSTRACT

A combined cooling and heating system having a simple design of a combined cooling and heat pump plant, especially for the heating and cooling of the passenger cells of motor vehicles. The concept of the invention is that the combined cooling and heat pump plant has a decompression device that fulfills the functions of a decompression device and a mode switch. The advantage of the invention is that dependent on the direction of flow, and thus the operational mode of the device, the decompression function and the blocking function, or the pressure relief function are realised by one component, the decompression device.

9 Claims, 3 Drawing Sheets

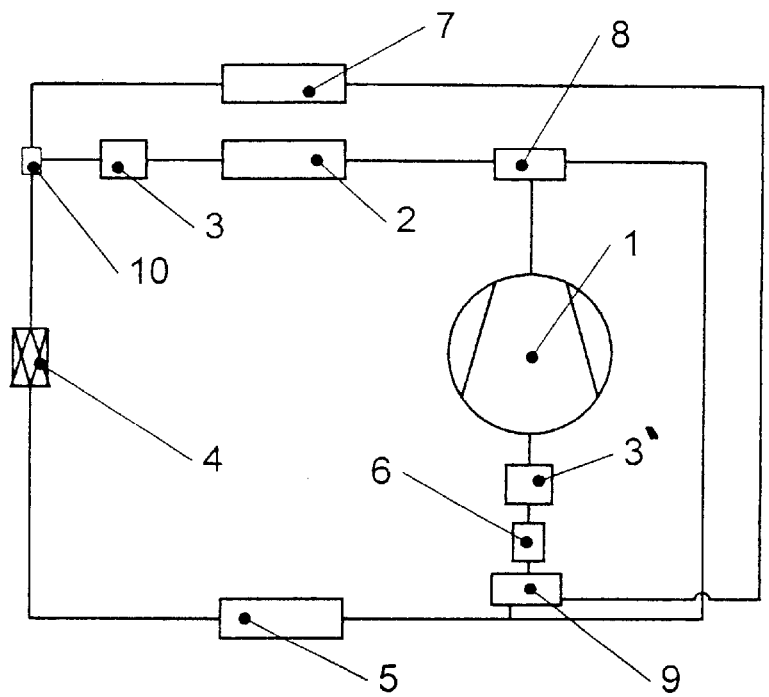
Fig. 1 - Prior Art
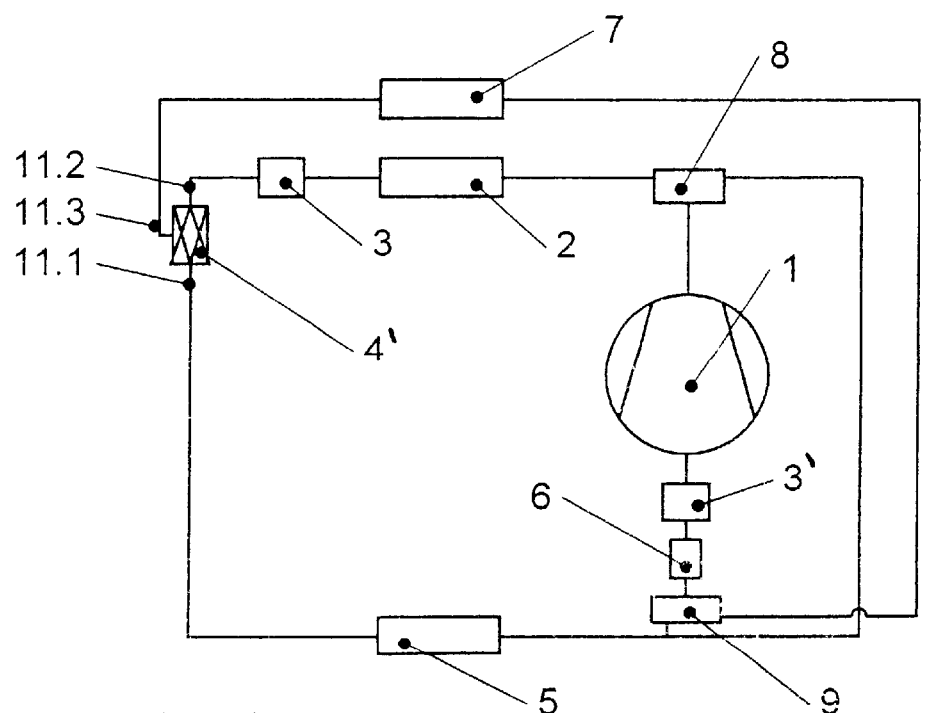
Fig. 2

COMBINED COOLING PLANT AND HEAT PUMP, ESPECIALLY FOR THE HEATING AND COOLING OF THE PASSENGER CELLS OF MOTOR VEHICLE

The invention relates to a combined cooling plant and heat pump, especially for the heating and cooling of the passenger compartments of motor vehicles.

BACKGROUND OF THE INVENTION

Cooling plants and heat pumps are used to cool or heat rooms of buildings. The varying weather conditions caused by the sequence of seasons frequently require a heating system in winter and transitional periods, and a cooling system in summer.

The state-of-the-art includes, apart from the monofunctional use of cooling plants and heat pumps, the combination of these devices, for example, to alternatively heat or cool rooms such-as habitable or-office rooms and storerooms as well, or to cool and heat the passenger compartments of motor vehicles.

This application clearly indicates the potential of the combination and mutual completion of cooling plants and heat pumps.

Future vehicle engines are expected to yield sufficient amounts of heat to heat the passenger compartments, but not at the required temperature level. Therefore, in some diesel-driven vehicles, supplementary heating systems with heater plugs, resistance heating or fuel-fired burners, have been provided.

This is due to the fact that modern combustion engines or electric motors tend to produce smaller amounts of waste heat at lower temperatures and hence, can no longer make available the amounts of heat at the temperature level required to heat the passenger compartments. Particularly in winter, the cold-start phase is a problem.

More and more motor vehicles are equipped with cooling plants to air condition the passenger compartments in summer.

Another possibility to enhance the heating situation in motor vehicles is to utilize the provided cooling plant as a heat pump in summer.

It is know from the state-of-the-art to combine cooling plants and heat pumps for the use in motor vehicles.

Use of various blocking devices and supplementary connection lines enables to change the heat input and output functions of the heat exchangers in such a system. The heat exchanger for cooling the passenger compartment is the evaporator of the cooling system and becomes the condenser/gas cooler of the heat pump in the heating mode.

The technical problem is essentially the economic acceptability of the approaches that can be technically realized.

In providing a cooling system for a passenger compartment it is, first, necessary to have a minimum of additional components, which are needed for heating operation and second, to design these components as useful and multifunctional as possible.

According to the concept of EP 0 945 290 A2, a cooling system of a combustion engine drive vehicle is modified in such a way that by means of an additional waste gas heat exchanger and two additional multiway blocking devices piped according to the invention, both the cooling system and heating operational modes are possible dependent on the temperature requirements inside the passenger compartment.

It is a specific disadvantage of this known state-of-the-art that the solution, according to EP 0 945 290 A2, that a combined cooling heating operation requires expensive circuitry and increases the cost of the device by making it necessary to use several multiway valves, or mode selectors, respectively, and a sophisticated expansion valve that can be passed in different directions of flow, or even two expansion valves with the necessary connection lines and blocking devices.

SUMMARY OF THE INVENTION

The concept according to the invention is that the combined cooling and heat pump plant has a decompression device that fulfills the functions of a decompression device and of a mode switch, or of a 3/2-directional valve for the cooling plant or heat pump modes, and the function of a safety device as well.

Therefore the decompression device according to the invention has three connections for coolant conduits and is entered by the high pressure coolant, depending on cooling or heat pump operational mode, at one side in each case. Depending on the entering direction of the coolant, different flow paths are provided, whereby these different flow paths are defined by a mechanically acting channel element which, actuated by the pressure of the flowing coolant automatically, takes two positions in the decompression device dependent on the entering direction of the coolant.

In the cooling mode position of the channel element, two connections of the coolant conduits are low pressure, namely, the glycol heat exchanger and the evaporator. In this operational mode, all three connections are connected to each other via the channel element.

In the heat pump mode position of the channel element, the connection leading to the glycol heat exchanger is low pressure and the connection leading to the outside heat exchanger is blocked.

The advantage of the invention is that dependent on the direction of flow, and thus on the operational mode of the device, the decompression function and the blocking function, or the pressure relief function are realized by only one component, namely the decompression device.

Additional benefits and advantages of the present invention will become apparent to those skilled in the art to which the present invention relates from the subsequent description of the preferred embodiment and the appended claims, taken in conjunction with the accompanying drawings.

BRIEF DESCRIPTION OF THE DRAWINGS

Details, features and advantages of the invention ensure from the following description of examples of embodiment with reference to the drawings. The figures show:

FIG. 1 is a schematic diagram of a prior art heating and cooling system;

FIG. 2 is a schematic circuit diagram of a combined cooling plant and heat pump;

DETAILED DESCRIPTION OF THE PREFERRED EMBODIMENT

Figure 3:
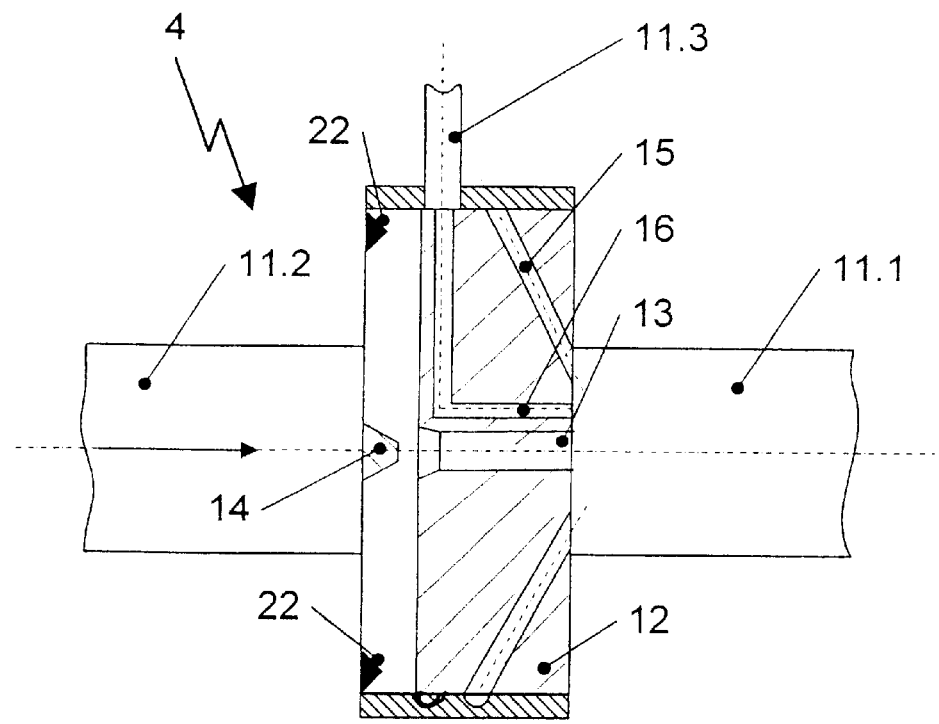
FIG. 3 is a decompression device in cooling plant operational mode.

In the state-of-the-art, a combined heat pump/cooling plant to FIG. 1 is known which uses the waste heat of the engine as an additional heat source and, therefore, includes another heat exchanger.

In a know way, this device is used in cooling plant mode as follows. The compressor 1 compresses the coolant which flows through the suitably switched 3/2-directional valve 8 into the outside heat exchanger 2 which functions as the condenser/gas cooler in the cooling operational mode, and condenses there. After having passed the interior heat exchanger 3 and the T-tube fitting 10, the coolant is decompressed in the decompression device 4 and the flows into the inside heat exchanger 5 where it evaporates for cooling the passenger compartment. If the evaporator 5 is operated as a flooded evaporator, a coolant collector 6 is usually arranged after it. Then the coolant vapor passes the interior heat exchanger 3 and is compressed anew by the compressor 1, closing the circuit.

In heat pump operational mode, the coolant flows through the 3/2-directional valve 8 into the inside heat exchanger 5 which now functions as condenser/gas cooler, and there releases the condensation heat to heat the passenger compartment. Decompression again takes place in the decompression device 4. The coolant now evaporates in the glycol heat exchanger 7, and the vapor flows through the coolant collector 6 and the interior heat exchanger 3 to the compressor 1, thus closing the circuit.

Based on this state-of-the-art, the risk continues existing that apart from the demand of a number of expensive components, problems of the coolant distribution within the device may occur during the operation of the combined cooling plant/heat pump. In both circuits there are active components in the circuit which are not being passed.

Such components are the outside heat exchanger 2 and the high-pressure side of the interior heat exchanger 3 in heat pump operational mode, and the glycol heat exchanger 7 in cooling plant operational mode, respectively, and the appropriate coolant conduits in each case. This can also be derived from the fact that the glycol heat exchanger 7 and the outside heat exchanger 2, as well as the high-pressure side of the interior heat exchanger 3, are connected to each other through the T-tube fitting 10 and form an unused side branch in each circuit. In addition, in the cooling plant operational mode the glycol heat exchanger 7 is pressurized, which is a permanent risk factor. If the regions are not blocked, one safety valve in the circuit is sufficient.

Further, there is the risk that coolant accumulates in the side branch formed in each case, and 'gets lost' from the active circuit.

In particular, when the device is operated in heat pump circuit mode coolant will accumulate in the heat exchanger 7 and condense. This coolant is no longer available within the circuit. It is possible to increase the filling quantity, which for economic and safety reasons is a questionable strategy to overcome the problem.

Of course, it would also be possible to use another 3/2-directional valve in the circuit instead of the T-tube fitting 10, but this measure makes the entire device even more expensive. An additional control system would be needed to operate an additional multiway valve and an additional safety valve would also be required, as this branch would be blocked and a separate safety device be necessary.

Based on this situation, it is the objective of the invention to achieve a simple design of a combined cooling plant and heat pump, especially for the heating and cooling of the passenger cells of motor vehicles.

FIG. 2 shows the schematic circuit diagram of a combined cooling system and heat pump according to the invention.

The essential components have already been explained in the description of the state-of-the-art shown in FIG. 1. The design and arrangement of the decompression device 4' is the significant difference. The decompression device 4', shown in greater detail in FIGS. 3 and 4, has three connections 11.1, 11.2, and 11.3 for coolant conduits. Dependent on the operational mode of the device as a cooling device or a heat pump, the decompression device 4' is entered by high-pressure coolant at the connection 11.1 or 11.2, respectively. Dependent on the operational mode, different flow paths are released for the decompression of the coolant in the decompression device 4'.

Figure 4:
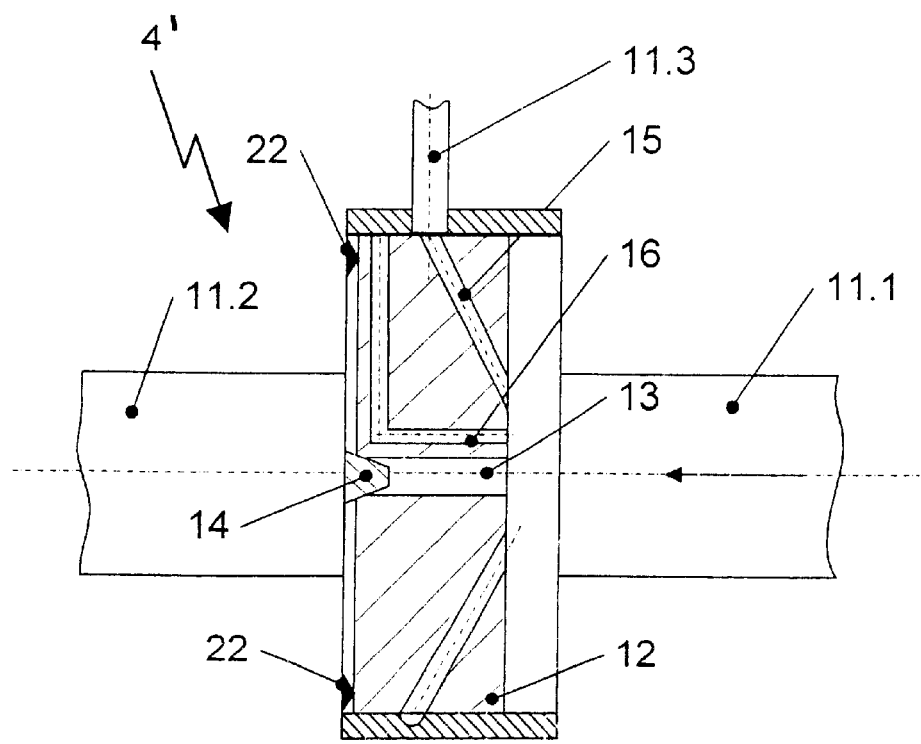
FIG. 4 is a decompression device in heat pump operational mode.

In a preferred embodiment of the invention, the decompression device 4' contains a mechanically acting channel element 12 with coolant channels [to] as shown in FIG. 3 and FIG. 4.

The channel element 12 advantageously has as coolant channels one or several restriction channels 13, at least one pressure relief channel 16 for the cooling [plant] operational mode, and at least one restriction channel 15 for the heat pump operational mode.

In the heat pump operational mode, the flow path to the outside heat exchanger 2 is blocked according to the position of the channel element 12.

For that to be realized according to the invention, as a blocking element for the restriction channel 13 at the decompression device 4', a blocking cone 14 is provided that is moveable to block the restriction channel 13 in heat pump operational mode.

This prevents the passage of coolant or additional flow of coolant into the outside heat exchanger 2.

If caused by unexpected conditions, the pressure in the outside heat exchanger 2 rises up to excessive levels, the channel element 12 to FIG. 4 will move to the right opening the blocked side branch until the pressure will have decreased to the high-pressure level, delivering coolant into the circuit. This is made possible because for equal area ratios, the channel element 12 of the decompression device 4' moves due to the resultant pressure ratio. In order to create pressure compensation due to the area ratio, distance elements 22, for example, at the casing of the decompression device 4', are provided which are shaped as ridges or conical elevations. Thus, the solution according to the invention also performs the function of a safety devices preventing any overpressure in the blocked side branch.

After the device has been switched off in the heat pump operational mode, the coolant will always accumulate at the coldest place, the outside heat exchanger 2.

In order to have the whole amount of coolant available in repeated heat pump modes, the device can first be operated in cooling plant mode in each case. Hereby the outside heat exchanger 2 is heated and the coolant flows into the inside heat exchanger 5, or into the rest of the device, respectively. This method has to be provided in the control strategy for the operation of the device.

In the cooling mode, the glycol heat exchanger 7 poses the same problem. According to the invention, the coolant, however, is under low pressure in the glycol heat exchanger 7 in this case. If shortage of coolant is detected, passing of hot glycol through the glycol heat exchanger 7 (the related peripheral circuit not shown) heats the coolant, which then flows back into the active circuit. In addition, the glycol heat exchanger 7 is not blocked from the device. In order to realize that, a permanent connection of the glycol heat exchanger 7 to the rest of the device on evaporation pressure level is provided via the pressure relief channel 16. This distinctly enhances the safety level in this part of the device due to the lower pressure in cooling mode.

This is especially important if carbon dioxide is used as a coolant in the combined cooling plant and heat pump.

To ensure safe operation of the device, the channel element 12 in the decompression device 4' is made movable. Due to the pressure of the flowing coolant, it automatically takes two positions in the decompression device 4' dependent on the direction of entry.

When after the change of the coolant's direction of flow the channel element 12 in the decompression device 4' is moved from one position into the other, it is guided mechanically, for example, by slots and corresponding elevations in order to avoid jamming or tilting of the channel element 12.

In cooling mode, the coolant connections 11.1, 11.3, and in heat pump mode the coolant connection 11.3, are at the evaporation pressure level. In heat pump mode the coolant connection 11.2 is blocked, as described above, by the blocking cone 14 at the decompression device 4'.

In particular, for carbon dioxide used as a coolant it is advantageous for the combined cooling plant and heat pump operation to provide different restriction cross-sections. This is easily made possible by the solution according to this invention. For that, the restriction channels 13 and 15 in the channel element 12 of the decompression device 4' are equipped with a varying cross-section flow areas, which allows to adapt the different density ratios of the coolant in either operational mode.

The coolant channels in the channel element 12 have, preferably, circular cross-sections and run linearly, curved, or helically in the channel element 12.

Another advantage is that the decompression device 4 can be adapted to the use in coolant circuits with different coolants, such as carbon dioxide, R134a or R290.

The use of the decompression device 4' according to the invention is advantageous not only for the field of mobile machinery such as vehicles, but also for stationary plants.

According to another preferred embodiment of the invention, the switching positions for the cooling plant or heat pump operational modes are realized using an electronically open-loop or closed-loop controled decompression device 17.

Figure 5:
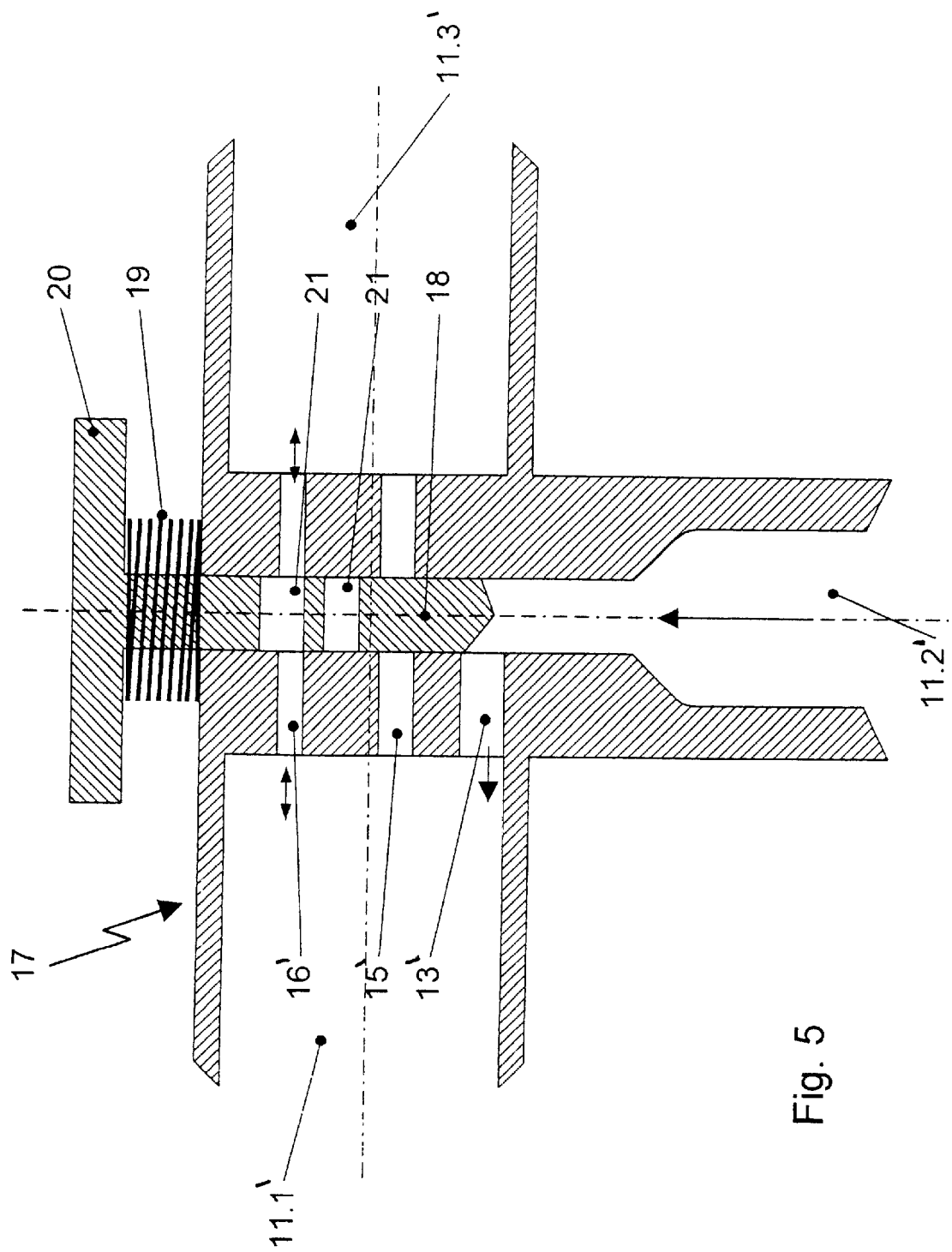
FIG. 5 is a controlled decompression device.

FIG. 5 shows the cross-sectional representation of an electro-mechanical decompression device 17. The valve element 18 is designed such that it enables several paths of the coolant. In the position shown, the decompression device 17 is in the position for cooling plant mode. The coolant at the coolant connection 11.2 is under high pressure and flows through the restriction channel 13' to the coolant connection 11.1', from where it is passed to the inside heat exchanger 5 which acts as an evaporator. Through the position of the valve element 18 it is achieved that, according to the invention, restriction of the coolant by means of the restriction channel 13' takes place simultaneously and, that the coolant connection 11.3' to the glycol heat exchanger 7 through the pressure relief channel 16' is at the low pressure level. This is achieved by means of a passage 21 provided in the valve element 18, which forms part of the pressure relief channel 16 in the valve position in the cooling mode.

In the heating mode, which has not been shown, the valve element 18 is, for example, moved downwards by an electro-mechanical drive. That, in the heating mode, connects the restriction channel 15' through a passage 21 and, at the same time, closes the pressure relief channel 16 and the restriction channel 13 for the cooling plant mode.

The drive 20 of the decompression device 17 is designed as a motor or a coil. According to the invention, the valve element 18 is electronically controlled. In the example of embodiment to FIG. 5, the reset force for the valve element 18 is provided by a spring 19.

In case of too high a pressure in the blocked branch 11.2' in heat pump operational mode, the valve element 18 can act as a pressure relief by means of the spring 19 in such a way that the valve element 18 is moved upwards and releases the restriction channel 13' for pressure relief. In case of carbon dioxide as the coolant, the spring 19 is adjusted such that the valve element 18 is moved upwards, for example, at a pressure of 140 bar and hence the blocked side branch is released for pressure relief.

While the above description constitutes the preferred embodiment of the present invention, it will be appreciated that the invention is susceptible to modification, variation and change without departing from the proper scope and fair meaning of the accompanying claims.

What is claimed is:

1. A combined cooling heating system, especially for the heating and cooling of the passenger compartments of motor vehicles comprising, a decompression device having three connections for coolant conduits through which high pressure coolant flows dependent on the operational mode of said system between a heating mode and a cooling mode, and that dependent on the operational mode, different flow paths for the decompression of the coolant in the decompression device are provided, wherein the decompression device contains a mechanically acting channel element with coolant channels including a first restriction channel and a pressure relief channel for the cooling operational mode, and a second restriction channel for the heating operational mode, and the decompression device having a blocking element which blocks the first restriction channel in the heating operational mode.

2. The combined cooling and heating system as claimed in claim 1 wherein the blocking element further comprises a blocking cone.

3. A combined heating system, especially for the heating and cooling of the passenger compartments of motor vehicles comprising, a decompression device having three connections for coolant conduits through which high pressure coolant flows dependent on the operational mode of said system between a heating mode and cooling mode and that dependent on the operational mode, different flow paths for the decompression of the coolant in the decompression device are provided, the decompression device includes a moveable channel element and due to the pressure of the coolant, the channel element automatically takes two positions in the decompression device dependent on the direction of the coolant's flow and in the cooling mode the coolant passes through a first restriction channel in the channel element and in the heating operational mode the first restriction channel is blocked by movement of the channel element and a second restriction channel is opened.

4. The combined cooling and heating system as claimed in claim 3 wherein the first and second restriction channels in the channel element have a differing passable cross-sectional area.

5. The combined cooling and heating system as claimed in claim 3 wherein the decompression device can be adapted to the use in the systems with different coolants, including carbon dioxide, R134a or R290.

6. The combined cooling and heating system as claimed in claim 4 wherein the first and second restriction channels in the channel element have circular cross-sections.

7. A combined cooling heating system, especially for the heating and cooling of the passenger compartments of motor vehicles comprising, a decompression device having three connections for coolant conduits through which high pressure coolant flows dependent on the operational mode of said system between a heating mode and cooling mode and that dependent on the operational mode, different flow paths for the decompression of the coolant in the decompression device are provided, the system having an electro-mechanical decompression device which has a valve element moveable between a first and second position With passages and that due to the valve element being placed in cooling operational mode restriction of the coolant takes place through a first restriction channel and a pressure relief channel is provided connecting with a heat exchanger and that when the valve element is in the second position in the heating operational mode.the first restriction channel and the pressure relief channel are closed at the same time and a second restriction channel is opened.

8. The combined cooling and heating system as claimed in claim 7 wherein the decompression device has a motor or a coil as a drive for the valve element between the first and second positions.

9. The combined cooling and heating system as claimed in claim 8 wherein the decompression device has a spring which delivers the force to reset the valve element.

* * * * *